United States Patent [19]

Hehl

[11] 4,382,763

[45] May 10, 1983

[54] SAFETY COVER FOR INJECTION MOLDING MACHINE

[76] Inventor: Karl Hehl, Arthur-Hehl-Strasse 32, 7298 Lossburg 1, Fed. Rep. of Germany

[21] Appl. No.: 290,225

[22] Filed: Aug. 5, 1981

[30] Foreign Application Priority Data

Aug. 5, 1980 [DE] Fed. Rep. of Germany ....... 3029629

[51] Int. Cl.³ .............................................. B29F 1/00
[52] U.S. Cl. .................................................. 425/153
[58] Field of Search ................................ 425/151–154

[56] References Cited

U.S. PATENT DOCUMENTS

| | | | |
|---|---|---|---|
| 3,386,133 | 6/1968 | Weiner | 425/153 |
| 3,728,057 | 4/1973 | Grundmann | 425/151 X |
| 3,744,949 | 7/1973 | Hehl | 425/153 |
| 3,771,936 | 11/1973 | Moslo | 425/153 |
| 3,804,003 | 4/1974 | Hehl | 425/152 X |
| 3,877,859 | 4/1975 | Grazine | 425/152 |
| 4,113,414 | 9/1978 | Hehl | 425/152 |

Primary Examiner—Thomas P. Pavelko
Attorney, Agent, or Firm—Joseph A. Geiger

[57] ABSTRACT

A safety cover assembly for the die closing unit of an injection molding machine having three jointly or separately openable safety gates on the front, top and rear of the unit supported in a cantilever-type guide arrangement on a U-shaped supporting frame, and a stationary cover assembly attached to the same frame and forming pockets into which the safety gates are retracted when opened. The supporting frame consists of three identical frame members, each carrying a safety gate and a gate drive in the form of a timing belt loop, as well as safety interlock switches and a safety interlock linkage for the operation of hydraulic and/or mechanical interlock devices. One frame member also carries a die displacement measuring unit.

16 Claims, 7 Drawing Figures

SAFETY COVER FOR INJECTION MOLDING MACHINE

BACKGROUND OF THE INVENTION

1. Field of the Invention

The present invention relates to injection molding machines and, more particularly, to a safety cover for the die closing unit of an injection molding machine which has jointly or separately operable safety gates on three sides of the die closing unit, cooperating with electrical and hydraulic safety interlock devices which block the operation of the die closing unit, when a safety gate is moved from its closed position.

2. Description of the Prior Art

Injection molding machines require a safety cover surrounding the die closing unit, in order to prevent access to the injection molding die, when the machine is in operation. Several types of safety covers which are equipped with appropriate electrical, hydraulic and/or mechanical interlock devices are known from my German Pat. Nos. 20 20 061, 21 46 042 and 25 28 907 and corresponding U.S. Pat. Nos. 3,744,949; 3,804,003 and 4,113,414, as well as from U.S. Pat. Nos. 3,386,133 and 3,728,057. The majority of these prior art solutions suggest a U-shaped safety cover which is guided for movement along stationary rods, in parallel alignment with the axis of the die closing unit.

Only the structure suggested in U.S. Pat. No. 3,744,949 provides for the cover assembly to be constituted by three separate cover panels which can be adjusted for separate mobility, so that only the front panel opens, for example, for limited quick access to the injection molding die. This solution, however, requires two stationary guide rods for each of the three cover panels, where a rigid U-shaped cover requires only two guide rods, one on each side of the die closing unit.

What all prior art safety covers have in common is that their cover guide rods extend across the entire length of the injection molding die, having one extremity attached to the stationary die carrier plate. These guide rods represent an obstacle for certain operations involving the injection molding die, especially for the use of devices which are designed for the mechanized insertion and removal of injection molding dies.

Another shortcoming of the various prior art solutions is that their safety interlock devices are mounted on various stationary components of the die closing unit and that, in most cases, the control rods which operate these safety devices protrude axially from the safety covers, thus representing a safety hazard and taking up valuable space.

SUMMARY OF THE INVENTION

It is therefore a primary objective of the present invention to offer a solution to the need for a safety cover on the die closing unit of an injection molding machine which is retractable without leaving supporting elements in the area of the injection molding die. Furthermore, by using building-block-type components, the safety cover is to be usable for more than one type of die closing unit, thereby leading to cost savings in connection with the large-scale production of injection molding machines.

The present invention proposes to attain these objectives by suggesting an improved safety cover for the die closing unit of an injection molding machine which features a central stationary supporting frame of portal-like structure which not only carries the various safety interlock devices, but also has stationary guide members which cooperate with guide rods that are fixedly attached to the safety cover. By thus making the guide rods the moving guide members, they move out of the die area, when the safety cover is retracted, giving a maximum of access to the injection molding die.

In a preferred embodiment of the invention, the supporting frame for the safety cover is an assembly of three identical frame members, forming the front, top and rear sides of the frame. The vertical frame members are adapted to be bolted directly to the machine base, being joined to the top frame member by means of suitable corner blocks. By standardizing the structure of the frame members for the attachment of the safety interlock devices and cover drive components, it becomes possible to utilize a single casting for the three frame members which make up the supporting frame. This casting is a relatively simple, elongated member, adapted for quantity production.

In line with the use of three identical frame members for the supporting frame, the invention suggests a safety cover which consists of three independent safety gates, to cover the front, top and rear sides of the injection molding die. Each safety gate is retractable independently, having appropriate safety interlock devices on its associated frame member.

Lastly, the invention suggests the arrangement of a stationary cover assembly on the outer side of the supporting frame, the cover assembly forming pockets which receive the three safety gates in their retracted positions. This cover assembly also serves as a support for portions of the safety gate drive and as a protective cover for a displacement measuring unit.

The safety gate drive is preferably in the form of a small electric gear motor which drives a timing belt with a belt lock and follower pin, and the safety gates are preferably provided with small bumpers to cushion their stops in the fully open and closed position. The safety interlock devices are preferably in the form of electrical switches and hydraulic valve actuating elements which are mounted on the supporting frame. This has the advantage that the safety gate itself can be utilized to directly actuate these switches and valves with appropriate cam surfaces.

BRIEF DESCRIPTION OF THE DRAWINGS

Further special features and advantages of the invention will become apparent from the description following below, when taken together with the accompanying drawings which illustrate, by way of example, a preferred embodiment of the invention which is represented in the various figures as follows.

DESCRIPTION OF THE PREFERRED EMBODIMENT

Figure 6:
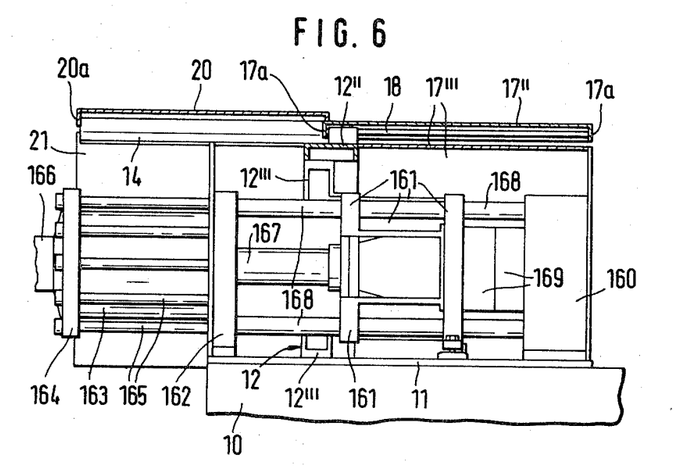
FIG. 6 shows an arrangement of the safety cover of the invention in conjunction with a push-type single-cylinder die closing unit.
Figure 7:
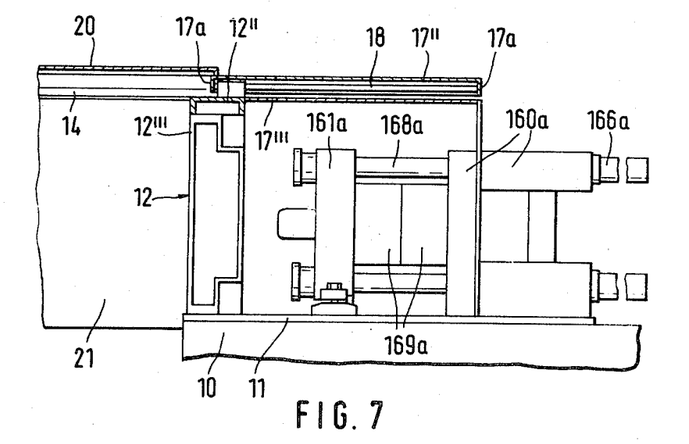
FIG. 7 shows an arrangement of the safety cover of the invention in conjunction with a pull-type four-cylinder die closing unit.

A typical injection molding machine has a machine base 10, of which a top portion is visible in FIGS. 1, 3, 6 and 7, and which carries a die closing unit, as shown in FIG. 6 or FIG. 7. In FIGS. 1-5, the die closing unit has been left off, in order to maximize the clarity of the drawings.

Figure 3:
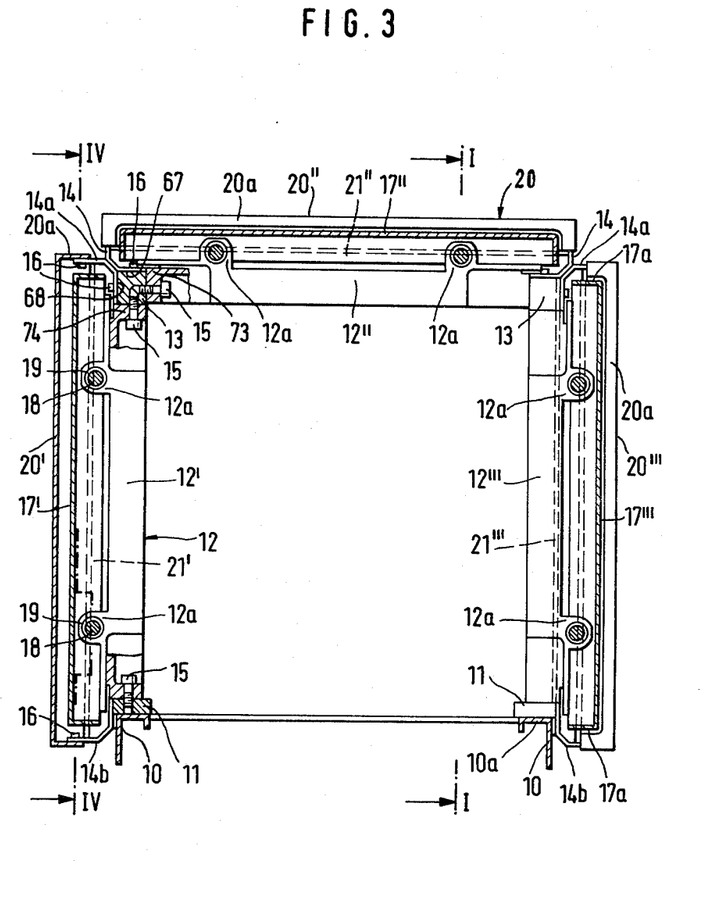
FIG. 3 shows the safety cover assembly of FIGS. 1 and 2 in a transverse cross section taken along line III—III of FIG. 2, various drive and safety devices mounted on the supporting frame being not shown.

In FIG. 3, the machine base 10 is shown to have on its upper side two longitudinal supporting ledges 10a which carry ledge reinforcements 11. The latter serve as a mounting base for a portal-like supporting frame 12 which consists of three identical frame members, a front frame member 12′, a top frame member 12″ and a rear frame member 12‴. This supporting frame reaches over the movement space required for the movable die carrier member of the die closing unit, as can be seen in FIGS. 6 and 7.

The supporting frame 12 carries three separate safety gates 17′, 17″ and 17‴, which in their closed position, cover the front, top and rear side, respectively, of the injection molding die and its stationary and movable die carrier plates. Each safety gate is supported and guided by its corresponding frame member in a cantilever-type arrangement, reaching forwardly from the frame member without the need for guide elements in the area of the injection molding die. The guide connection between the front safety gate 17′, for example, and its supporting frame member 12′, consists of two laterally extending eye bulges 12a on the outside of the frame member 12′ and two cooperating guide rods 18 on the safety gate 17′ which form a straight-line guide in parallel alignment with the longitudinal axis of the die closing unit. Each eye bulge 12a holds two longitudinally spaced ball bushings 19 which provide a clearance-free anti-friction guide connection. The guide rods 18 extend on the inside of the safety gate 17′, being fixedly attached to the latter.

Figure 4:
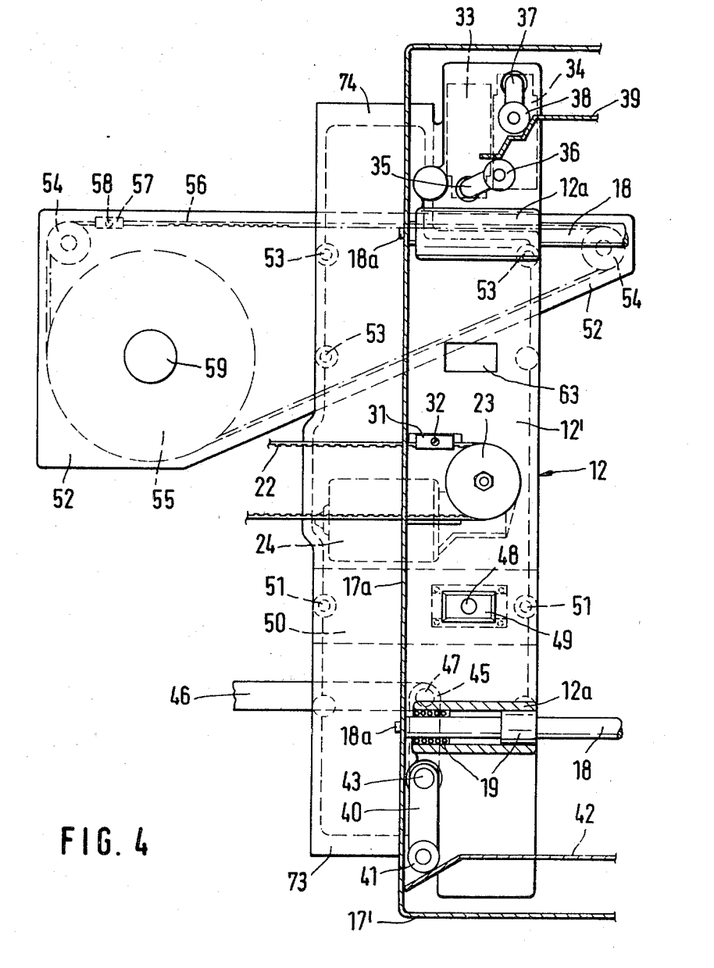
FIG. 4 shows, at an enlarged scale and in a cross section taken along line IV—IV of FIG. 3, the front frame member of the supporting frame with various devices attached to it, including a portion of the front safety gate in the closed position.

The safety gate 17′ is a rectangular, generally flat sheet metal stamping with upstanding flanges 17a on its four sides, the guide rod 18 being clamped to two opposite gate flanges 17a by means of clamping screws 18a (FIG. 4). The four ball bushings 19 which carry the safety gate 17′ represent the only connection between the safety gate and the supporting frame 12. The front and rear safety gates 17′ and 17‴ have windows 69.

Figure 1:
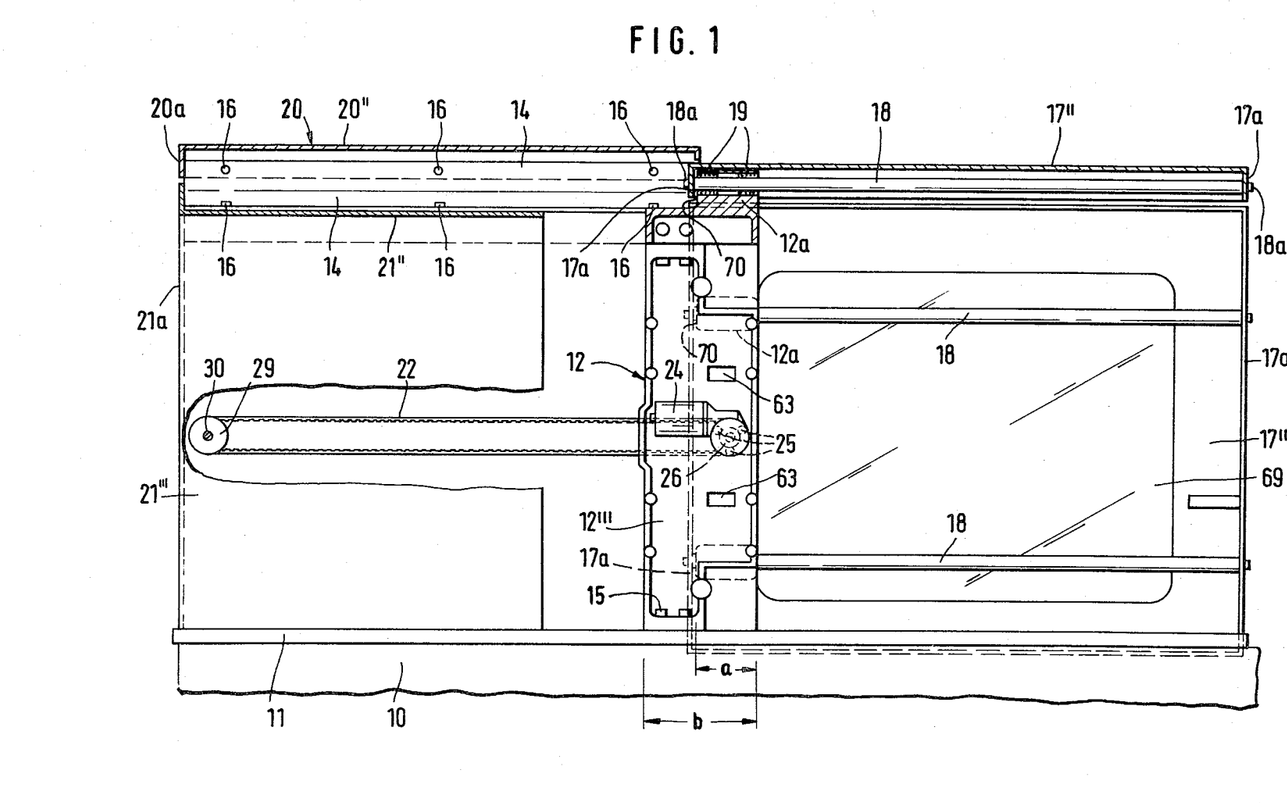
FIG. 1 represents a safety cover assembly for a die closing unit, shown in an elevational cross section taken along line I—I of FIG. 3, the die closing unit being not shown.
Figure 2:
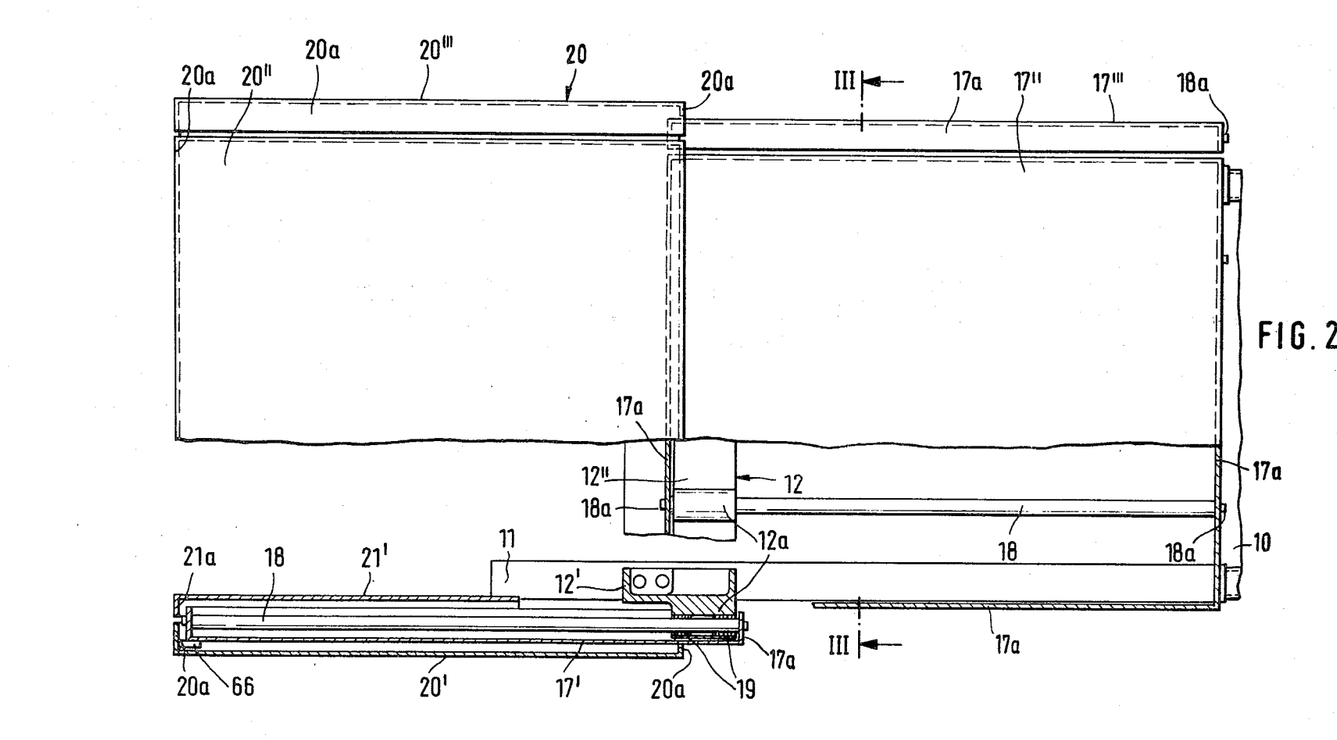
FIG. 2 shows the safety cover assembly of FIG. 1 in a plan view, portions of the assembly being cut away and cross-sectioned, and the front safety gate is shown in the fully open position.

As can be seen in FIGS. 1 and 2, the axial length a of the eye bulges 12a is less than the axial width b of the supporting frame 12, the die-side extremity of the eye bulges 12a being flush with the frame. In the closed position of the safety gate 17′, its flange 17a almost abuts against the distal extremity 70 (FIG. 1) of the eye bulge 12a.

Figure 5:
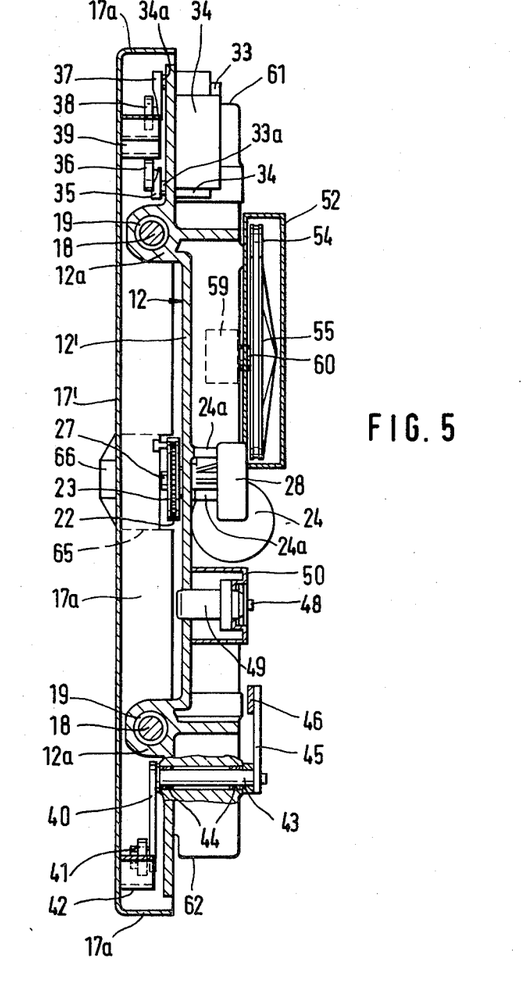
FIG. 5 shows the frame member of FIG. 4 in a transverse cross section.

Each frame member also has transversely extending end flanges 73 and 74 (FIG. 4) which are recessed from its extremities and which form parallel opposite attachment faces 62 and 61, respectively (FIG. 5). With these attachment faces, the frame members are clamped to the ledge reinforcement 11 of the machine base and to each other, using prismatic corner blocks 13 and bolts 15, as can be seen in FIG. 3.

The corner blocks 13 and the ledge reinforcements 11 also serve as supports for a stationary cover assembly 20 which extends in the direction away from the injection molding die, covering stationary components of the die closing unit, such as a power cylinder, for example. Like the three-piece supporting frame 12 and like the three-gate safety cover, the cover assembly 20 consists of three identical cover panels 20′ and 20″ and 20‴, on the front, top and rear, respectively, of the die closing unit. The three cover panels are so arranged that the corresponding safety gates move behind them, or under them, into their retracted open position. Accordingly, the cover assembly 20 forms the same U-shaped outline as the three safety gates, only slightly wider and higher.

The upper cover panel 20″ of the cover assembly 20 is supported on two mounting angles 14 (FIG. 3) which are attached to the upper faces 67 of the corner blocks 13 by means of screws 16. The vertical cover panels 20′ and 20‴ are similarly supported by upper mounting angles 14a which are attached to lateral mounting faces 68 of the corner blocks 13 and by lower mounting angles 14b which are attached to the lateral faces of the ledge reinforcements 11. Like the safety gates 17′, 17″ and 17‴, the cover panels 20′, 20″ and 20‴ are in the form of rectangular, generally flat members with circumferential flanges 20a of which the frame-side flanges are appropriately cut out to accommodate the profile of the safety gates 17′, 17″ and 17‴, (FIG. 2). Although the cover assembly 20 is attached to the supporting frame 12 at only four points, the three cover panels 20′, 20″ and 20‴ form a stable structure, thanks to the mounting angles 14 and 14a which, being connected to form an X-shaped profile, and running the full length of the cover panels with a plurality of attachment points to their flanges 20a, form rigid corner structures of the cover assembly 20.

To each of the three cover panels 20′, 20″ and 20‴ is further attached an interior panel 21′, 21″ and 21‴, respectively, which, as can be seen in FIG. 2, forms a pocket for the retracted safety gate 17. These interior panels are likewise flat stampings with peripheral flanges 21a. The interior panels 21′, 21″ and 21‴ may be integral portions of the mounting angles 14, 14a and 14b, thus further strengthening the cover assembly 20. The cutouts in the frontal flanges of the cover panels 20′, 20″ and 20‴ are preferably closely spaced from the contour of the safety gates 17′, 17″ and 17‴, so as to make it impossible for a finger or some object to be drawn into the gap between the cover panel and the safety gate, when the latter is opened.

As can be seen in FIG. 2, the frame member 12′ has a U-shaped cross section, with a base wall in parallel alignment with the axis of the die closing unit and two short flange portions extending transversely towards the center of the frame 12. The eye bulges 12a protrude outwardly from the base wall of the U-profile. The hollow shape of the frame members makes it possible to arrange a number of accessory components on the inside of the supporting frame, recessed between its flange portions and out of ready access. The latter feature is desirable for safety interlock devices, in order to make tampering more difficult.

Among the accessory components which are mounted on the supporting frame 12 is a gate motor 24, as part of a gate drive which opens and closes the safety gate (FIG. 1). Each of the three safety gates 17', 17" and 17'" is preferably equipped with its own gate drive so that the three gates can be opened separately or simultaneously.

As can be seen in FIGS. 4 and 5, the gate motor 24 is a gear motor, having a transversely oriented drive shaft 27. The gear housing 28 includes three mounting studs 24a by which the gate motor 24 is attached to the base wall of the frame member 12'. The drive shaft 27 reaches through a positioning bore 26 for the gate drive (FIG. 1), carrying the drive pulley 23 of a timing belt drive. This drive further includes an idler pulley 29 mounted near the far extremity of the interior panel 21' (FIG. 1) by means of a shaft 30. A timing belt 22 spans the pulleys 23 and 29, having its cut ends held together by a belt lock 31 which carries a follower pin 32 in driving engagement with the safety gate 17', in the vicinity of its flange 17a (FIG. 4).

Thus, when the gate motor 24 of FIG. 4 is switched on, it rotates the drive pulley 23 and the timing belt 22 in a counterclockwise direction, thereby moving the follower pin 32 and the connected safety gate 17' to the left, away from the injection molding die. The timing belt drive is so arranged that the belt lock 31 stops just short of the idler pulley 29, when the safety gate 17' is in its fully open position, shown in FIG. 2. A reversal of the gate motor 24 causes the safety gate 17' to move towards the injection molding die, until it reaches the closed position shown in FIG. 4. The controls for the gate motor 24 may be so arranged that the direction of rotation is reversed automatically, as soon as the drive encounters a certain level of movement resistance.

The gate motor 24 is preferably also connected to suitable end switches, or to other displacement controls, which provide for the motor to be shut down shortly before the safety gate reaches its fully open or fully closed position, allowing for the kinetic energy of the moving parts to displace the safety gate 17 against the panel flanges 20a and 20b, when the safety gate coasts into its extreme positions. A bumper 66 is attached to the distal extremity of the safety gate 17' by means of a bumper bracket 65 (FIG. 5), its axial length being equal to the difference between the interior length of the cover panel 20' and the opening stroke of the safety gate 17'.

FIGS. 4 and 5 also show that the front frame member 12' carries a die displacement measuring unit 52 . . . 60. This unit consists essentially of a flat guard case 52 which is bolted to the upstanding flange portions of the U-profile of frame member 12' by means of three attachment bolts 53. The guard case 52 encloses within a triangular space two small pulleys 54 which form a horizontal run for the timing belt 56 in which the end cuts of the belt are joined by means of a belt lock 57. The latter carries a follower pin 58 which is connected to one of the movable parts of the die closing unit, in order to transmit the opening and closing movements of the die to the timing belt 56.

In the lower portion of the guard case, the timing belt drives a large pulley 55 whose circumference is greater than the maximum length of the die opening stroke, the pulley 55 being directly connected to a rotary potentiometer 59 which produces an electrical potential reflecting the position of the movable die. This device serves to adjustably control the die opening and closing movements. The large pulley 55 and the wiper shaft of the rotary potentiometer are directly coupled together, and the assembly is centered in the wall of the guard case by means of a centering collar 60.

Each frame member of the supporting frame 12 carries safety interlock devices which will shut down the die closing unit, when the safety gate is opened, even by a small distance. These safety interlock devices include electrical switches which open the main control circuit of the die closing unit and a mechanical linkage which operates a hydraulic valve and/or engages a mechanical interlock device blocking any further movement of the die closing unit.

The switches for the electrical interlock are arranged on the upper extremity of the frame member 12' and they include an interior switch 33 and an exterior switch 34 (FIGS. 4 and 5). Both switches are arranged on the inside of a vertical wall portion of the frame member 12', their switch shafts 33a and 34a reaching to the opposite side of the wall portion, where they carry roller arms 35 and 37 with contact rollers 36 and 38, respectively. The two switches 34 and 35 are spring-loaded, being actuated by a common switching cam 39 which is fixedly attached to the wall of the safety gate 17'. The contact rollers 36 and 38 of the two switches are arranged on opposite sides of the switching cam 39 so that, in each switching motion, one contact roller is depressed, while the other one is released. Only a very short opening motion of the safety gate 17' will sufficiently deflect the roller arm 37 of switch 34 to interrupt an electrical control circuit. Shortly thereafter, the release of the roller arm 35 will establish a safety circuit across the switch 33.

In the bottom portion of the frame member 12' (FIGS. 4 and 5) is arranged a safety linkage for the hydraulic and/or mechanical shutdown of the die closing unit, when the safety gate 17' is opened. This linkage consists of a pivot shaft 43 which is supported in a transverse bore of the frame member 12' by means of two spaced bushings 44. The pivot shaft 43 carries on the outer side of the frame member a crank 40 with a cam follower 41 in engagement with a ramp 42 which extends over the length of the safety gate 17'. It has an inclined extremity which, in cooperation with the flange 17a of the safety gate, brings the crank 40 into a vertical orientation in the closed position of the safety gate 17'. In all other positions of the safety gate, the cam follower 41 rides on the ramp 42, maintaining the crank 40 in an inclined position. The pivot shaft 43 transmits the movements of the crank 40 to a control arm 45 on the inner side of the frame member 12' and to a horizontal control rod 46 which is pivotably connected to the free end of the control arm 45. The horizontal movements of the control rod 46 are transmitted to a hydraulic valve and/or a mechanical interlock device, both of which are not part of this invention and are therefore not shown.

Also arranged on the inside of the frame member 12' is a proximity switch 48 with a switch housing 49 which reaches outwardly through the wall of the frame member 12' so that the switch faces the safety gate 17'. The proximity switch 48 can be used to control an electrical circuit, when the safety gate 17' is in a specific opening position. The proximity switch 48 is mounted inside a connection box 50 which is attached to the frame member 12' by means of screws 51. The connection box 50 is a collecting point for the electrical wiring of the gate motor 24, safety interlock switches 33 and 34, and displacement measuring unit 52 ... 60. A wire harness runs from the connection box 50 to the outside of the safety cover assembly.

In order to make it possible to utilize three identical frame members as constituent parts of the supporting frame 12, each of the frame members 12', 12" and 12'" has its bores, apertures and mounting bosses arranged in a symmetric configuration with respect to the center of the frame member (see FIGS. 1 and 4). Accordingly, the positioning bore 26 and the bores 25 for the mounting studs 24a of the gate drive are arranged in the center of the frame member, the eye bulges 12a are spaced at equal distances from the center, and the rectangular mounting aperture 63 for the proximity switch 48 is duplicated on the opposite side of the center. Likewise, the bosses which receive the attachment bolts 53 of the die displacement measuring unit are four in number and duplicated symmetrically, as are the various bosses which accommodate the switch shafts 33a and 34a and the pivot shaft 43. This makes it possible, for example, to arrange the safety interlock switches on the upper extremities of both vertical frame members 12' and 12'" and to similarly arrange the proximity switches 48 on a common level.

A major advantage of the present invention derives from the fact that the area surrounding the injection molding die is entirely free of guide members, following the retraction of the three safety gates. The absence of guide members makes it possible to install a device which automatically exchanges injection molding dies in conjunction with a device which hydraulically attaches the injection molding die to the die closing unit.

An additional advantage of the present invention relates to a higher degree of safety against accidents, due to the arrangement of the safety interlock devices on the inside of the supporting frame 12, where it is more difficult for untrained or unauthorized personnel to tamper with the safety interlock devices.

FIG. 6 illustrates an arrangement of the described safety cover of the invention in conjunction with a die closing unit of single-cylinder push-type configuration. The drawing shows that the safety cover encloses the entire die closing unit including its cylinder assembly.

A stationary die carrier plate 160 is mounted on the right-hand extremity of the ledge reinforcements 11, and a likewise stationary cylinder head plate 162 is mounted on the left-hand extremity of the members 11. The latter is aligned with the left-hand extremity of the machine base 10. Between the die carrier plate 160 and the head plate 162 extend four tie rods 168 which form a rigid stationary frame and longitudinal guides for a movable die carrier frame 161. The injection molding die 169 is shown in its closed position. To the left-hand side of the movable die carrier frame 161 is attached the piston rod 167 of a heavy hydraulic cylinder assembly, the power cylinder 163 extending to the left from the cylinder head plate 162. A number of tie bolts 165 clamp the power cylinder 163 and a cylinder cover 164 to the head plate 162. The cylinder cover 164 carries a smaller auxiliary cylinder 166. As can be seen in the drawing, the safety cover of the invention extends longitudinally from the stationary die carrier plate to the cylinder cover, the supporting frame 12 being arranged at approximately the plane in which the piston rod 167 is attached to the pressure transfer wall at the rear of the movable die carrier frame 161, with the latter in its closed position.

FIG. 7 illustrates an arrangement of the described safety cover of the invention in conjunction with a die closing unit of pull-type configuration with four parallel cylinders. The die closing unit is again mounted on the ledge reinforcements 11 of the machine frame 10. A stationary cylinder mount 160a forms a stationary die carrier plate while housing four power cylinders with coaxially attached auxiliary cylinders 166a. The movable die carrier plate 161a is attached to the distal extremities of the four piston rods 168a. The injection molding die 169a is likewise shown in the closed position. The supporting frame 12 of the safety cover assembly is located to the left of the movable die carrier plate 161a, approximately in alignment with the fully open position of the plate 161a. The safety gates 17', 17" and 17'" thus cover the entire area of the injection molding die, including its die carrier plates.

It should be understood, of course, that the foregoing disclosure describes only a preferred embodiment of the invention and that it is intended to cover all changes and modifications of this example of the invention which fall within the scope of the appended claims.

I claim the following:

1. A safety cover assembly enclosing the area of the injection molding die of the die closing unit of a plastic injection molding machine having at least one safety gate which is retractable in the direction of the die opening movements and having a supporting member carrying and guiding the safety gate, including guide means for the safety gate comprising outer guide members (eyes or rollers) and inner guide members in the form of guide rods, as well as safety interlock triggering elements on the safety gate cooperating with electrical and hydraulic safety interlock devices which are arranged solidary with the die closing unit, as part of a system of safety controls for the die closing unit, characterized in that the supporting member carrying the safety gate (17',17",17'") is in the form of a supporting frame (12) which extends over the die closing unit in a portal-like fashion, being mounted on the machine base (10) and carrying stationary guide members as well as safety interlock devices (33 ... 39; 48 ... 50; 40 ... 47) for the safety gate.

2. A safety cover assembly in accordance with claim 1, characterized in that the electrical safety interlock device (33 ... 38) controlling the electrical circuit of the die closing unit includes two switches (33,34) which are arranged on the inside of the supporting frame (12), the switches (33,34) having switch shafts (33a,34a) reaching through a wall portion of the frame member (12') and carrying roller arms (35,37) with contact rollers (36,38) engageable by a switching cam (39) of the associated safety gate (17').

3. A safety cover assembly in accordance with claim 1, characterized in that the safety interlock device (40 ... 47) which controls the hydraulic circuit of the die closing unit, while blocking the movements of the die closing unit in an open position of the safety gate, includes a safety linkage consisting of a pivot shaft (43) journalled in a wall portion of the frame member (12'), with a crank (40) and cam follower (41) on one side and a control arm (45) on the other side transmitting movements imposed on the crank (40) by a ramp (42) of the safety gate (17') to a control rod (46).

4. A safety cover assembly in accordance with claim 1, characterized in that the supporting frame (12) further carries on its inner side a proximity switch (48) of which the switching extremity reaches through a wall portion of the frame member (12'), into switching distance with a member of the safety gate (17') thereby producing switching signals for the circuit of the die closing unit which open or close the latter.

5. A safety cover assembly in accordance with claim 1, characterized in that it includes three identical safety gates (17',17",17"') of a generally flat outline with inwardly oriented flanges (17a) clampingly holding the guide rods (18) between them.

6. A safety cover assembly in accordance with claim 1, characterized in that the supporting frame (12) also carries a stationary U-shaped cover assembly (20) which forms a continuation of the movable safety gates (17',17",17"') in their closed positions and a receiving enclosure for the safety gates in their retracted position.

7. A safety cover assembly in accordance with claim 1, characterized in that the supporting frame (12) is composed of three identical frame members (12',12",12"') and that the guide rods (18) of the safety gate are guided in eye bulges (12a) of the frame members.

8. A safety cover assembly in accordance with claim 7, characterized in that each of the eye bulges (12a) holds two longitudinally spaced ball bushings (19) and that the longitudinal length (a) of the eye bulges is less than the width (6) of the frame members (12',12",12"') in the direction of safety gate displacement.

9. A safety cover assembly in accordance with claim 7 or 8, characterized in that the frame members (12',12",12"') of the supporting frame (12) have a U-shaped cross-section which is open in the direction towards the center of the die closing unit and that the frame members (12',12",12"') are connected to each other at the corners of the supporting frame (12) by means of prism-shaped corner blocks (13) which form two free, outwardly oriented mounting faces (67,68 in FIG. 3) in parallel alignment with the movement direction of the safety gate.

10. A safety cover assembly in accordance with claim 1, characterized in that the stationary cover assembly (20) is mounted in place by means of mounting angles of which two mounting angles (14) are attached to the free mounting faces (67) of the corner block (13) to carry a top cover panel (20") and two mounting angles (14a) are attached to the free mounting faces (68) of the corner blocks (13) to carry front and rear cover panels (20',20"') of which the lower edges are attached to ledge reinforcements (11) of the machine base (10) by means of lower mounting angles (14b).

11. A safety cover assembly in accordance with claim 10, characterized in that the three cover panels (20',20",20"') of the stationary cover assembly (20) have panel flanges (20a) and the cover assembly (20) further includes interior panels (21',21",21"') with similar edge flanges (21a) forming pockets with the associated cover panels (20',20",20"') receiving the safety gates (17',17",17"') in their retracted positions.

12. A safety cover assembly in accordance with claim 1, characterized in that at least one safety gate (17') includes a gate motor (24) as part of a fixed timing belt loop with a timing belt (22) running over two pulleys (23,29) and carrying a belt lock (31) with a follower pin (32) connected to the safety gate (17').

13. A safety cover assembly in accordance with claim 12, characterized in that the gate motor (24) is arranged to reverse its direction of rotation in response to a certain level of movement resistance and that the end shutdown of the motor (24) is controlled by means of a displacement measuring device which is set for a shorter displacement than the full displacement amplitute of the safety gate (17').

14. A safety cover assembly in accordance with claim 13, characterized in that the shutdown of the gate motor (24) causes the safety gate (17') to coast to its extreme displacement position, where a resilient stop (66) provides an abutment.

15. A safety cover assembly in accordance with claim 1, characterized in that the supporting frame (12) carries a die displacement measuring unit (52 . . . 60) which serves to control the movements of the movable die carrier plate of the die closing unit.

16. A safety cover assembly in accordance with claim 15, characterized in that the die displacement unit (52 . . . 60) includes a guard case (52) which is attached to a frame member (12') of the supporting frame (12) and timing belt pulleys (54,55) supporting a timing belt (56) with a timing belt run which is parallel to the movement axis of the die closing unit and includes a belt lock (57) and a follower pin (58) which is connected to the movable die carrier plate of the die closing unit, while a large pulley (55) drives a coaxially connected rotary potentiometer (59).

* * * * *